United States Patent

[11] 3,603,925

| [72] | Inventors | Harold W. Hughes;<br>Samuel E. Stone, both of St. Joseph, Mich. |
|---|---|---|
| [21] | Appl. No. | 769,327 |
| [22] | Filed | Oct. 21, 1968 |
| [45] | Patented | Sept. 7, 1971 |
| [73] | Assignee | The Bendix Corporation |

[54] MASTER CYLINDER RESERVOIR LEVEL INDICATOR
2 Claims, 4 Drawing Figs.

[52] U.S. Cl. .................................... 340/59, 73/308, 340/244 E
[51] Int. Cl. .................................... B60t 17/22, G01f 23/12
[50] Field of Search .................................... 340/59, 244 A, 244 B, 244; 73/308, 313; 200/84

[56] References Cited
UNITED STATES PATENTS

| 3,204,230 | 8/1965 | Hosford | 340/59 |
| 3,242,474 | 3/1966 | Gast et al. | 340/244 A |
| 3,408,053 | 10/1968 | Vantroba | 73/313 |

Primary Examiner—John W. Caldwell
Assistant Examiner—Howard S. Cohen
Attorneys—Richard G. Geib and Plante, Arens, Hartz and O'Brien ABSTRACT: A reed switch assembly that is integrated with a lid for a fluid reservoir and has a float within which a magnet is affixed to operate the reed switch and close an electrical circuit upon the approach of a predetermined low level of the fluid in the reservoir.

PATENTED SEP 7 1971
3,603,925
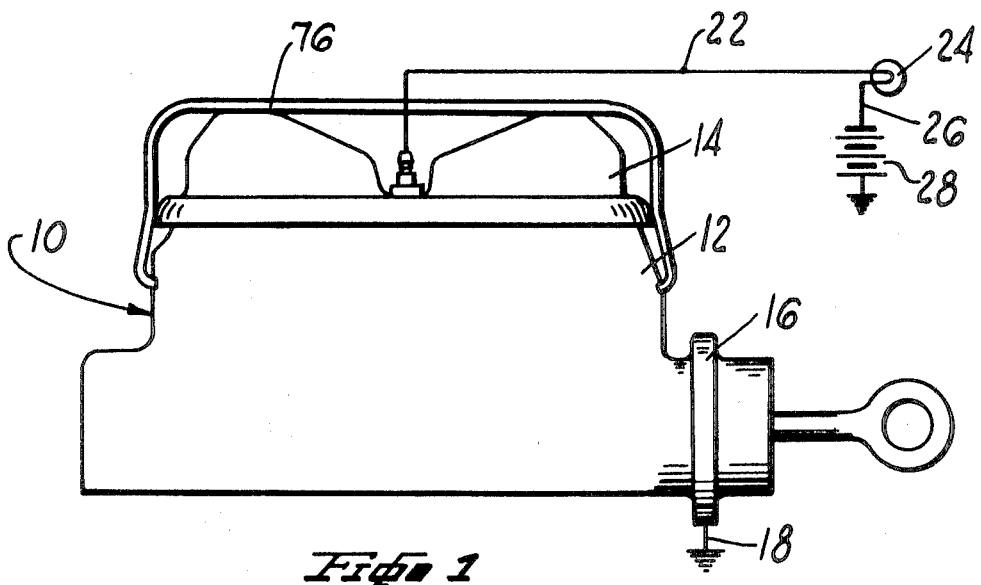
*Fig. 1*
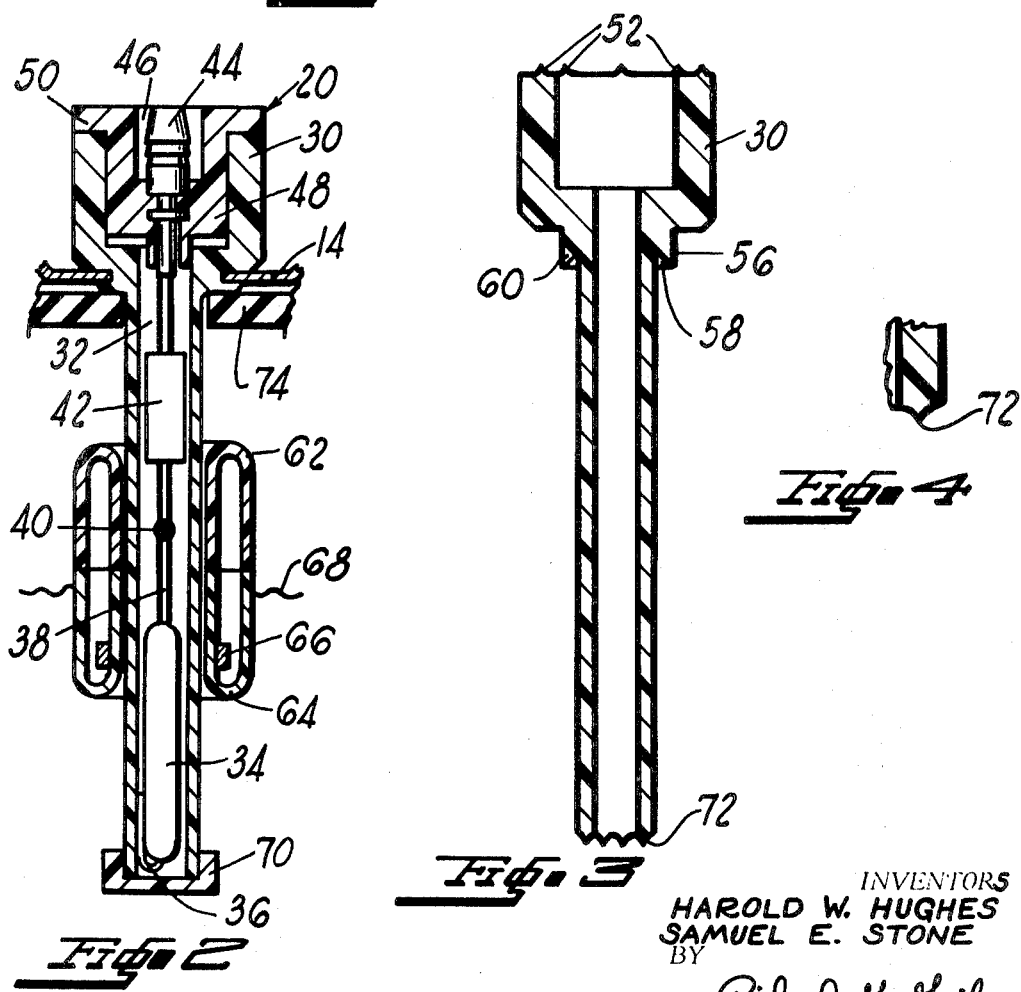
*Fig. 2*
*Fig. 3*
*Fig. 4*
INVENTORS
HAROLD W. HUGHES
SAMUEL E. STONE
BY
Richard G. Geib
ATTORNEY

MASTER CYLINDER RESERVOIR LEVEL INDICATOR

SUMMARY

Most all hydraulic fluid systems require a reservoir for the supply of the hydraulic fluid to the system and the replenishment of losses in the system. The particular system of this type is present in a vehicle whereby a master cylinder is provided with a fluid reservoir for replenishing the hydraulic brake fluid in the system, as required for various and sundry reasons all familiar to those skilled in the arts.

With regard to such vehicle hydraulic brake mechanisms they are, as a rule, very carefully constructed and as nearly leakproof as possible. Experience, however, has shown that small leads, especially past the piston in the master cylinder, can take place, and the fluid will gradually be dissipated. In such systems it has been the usual practice of service station operators and mechanics who recognize this problem to usually check the level of the brake fluid in the brake cylinder reservoir upon each servicing operation whereby the level conditions are usually observed in time to remedy the same.

In addition to the slight slow loss of fluid that nearly always takes place, it sometimes happens that the pipes or connections to which the brake fluid is transferred from the master cylinder to the brake-operating mechanism spring a leak, in which case the fluid disappears quite rapidly and unless some means is provided to apprise the driver of the fact that there is a shortage of brake fluid, he may discover this only when he tries to apply the brakes and finds that they do not respond. It is believed that for this reason the Federal Motor Vehicle Safety Standards were implemented an defined to provide for the use of a master cylinder reservoir level indicator light as a means of meeting the brake effectiveness indicator provisions of these regulations.

It is a principal object of this invention, therefore, to provide a simple, and thus economic, brake effectiveness indicator system for such a vehicle hydraulic brake system, which is also applicable to almost any type of hydraulic fluid system having a fluid reservoir which must be constantly observed to give ample warning of a low hydraulic fluid level therein.

A more particular object of this invention is to provide such a fluid level indicator for a lid of a reservoir that may be removed therewith from time to time as fluid replenishment is required or as servicing is undertaken that will not interfere with the removal and reinstallation of the lid, and will not require the replacement or other steps during such occurrences.

DRAWING DESCRIPTION

Other objects and advantages of this invention will appear to those skilled in this art upon reading the following description of the drawings in which:

FIG. 1 is a drawing of a vehicle brake master cylinder with the vehicle's electrical system and an indicator means shown schematically and connected therewith;

FIG. 2 is an enlarged cross-sectional view of the switch assembly for the master cylinder of FIG. 1;

FIG. 3 is a cross-sectional vie of the housing for the switch assembly; and

FIG. 4 is a partial cross-sectional view of the lowermost end of the housing shown in FIG. 3.

With reference now to FIG. 1, there is shown a master cylinder 10 having a fluid reservoir portion 12 enclosed by a cap or lid 14 that is attached by means of flange 16 to a firewall (not shown) between the engine compartment and passenger compartment of a vehicle. This attachment provides a ground connection schematically illustrated as at 18 for the master cylinder 10. Master cylinder 10 is provided with a switch means generally indicated as at 20 connected by a lead 22 to a bulb 24 within the dash of the vehicle. Another electrical lead 26 connects the bulb 24 to the vehicle's storage battery 28.

With reference now to FIG. 2 the switch assembly 20 is shown to comprise a plastic housing 30 having a stepped bore 32 within which a switch mechanism is assembled. The switch mechanism includes a reed switch capsule 34; i.e., a capsule containing spring contacts which are separated by an air gap and constructed of magnetic material. The capsule has a lead 36 from the bottom thereof that is formed of spring steel and bent upwardly to be biased on to the walls of the bore 32 at the bottom of the housing 30. It should be noted that the capsule 34 is preferably made from a material which is nonmagnetic for enclosing the contacts (not shown) aforementioned, and the spring wire 36 will normally abut the walls of the bore 30 while urging the housing of the capsule 34 away therefrom so that a current path is not established via the spring lead 36 back into the housing for the reed switch capsule 34. Capsule 34 has another lead 38 that is soldered as at 40 to a resistor 42 connected to a male terminal 44 within a recess 46 of a plug 48 closing the upper end of the bore 32 when joined to the housing 30.

Plug 48 has a radial flange 50 which is bonded to limited area projections 52, as by ultrasonic or spin welding in order to seal this upper end of the housing 30 when the reed switch has been inserted thereinto. The housing 30 is provided with a boss 56 that is angularly recessed as at 58 to provide deformable tips 60 (see FIG. 3) that are staked to lid 14 by folding the tips 60 thereover.

In that the housing 30, shown as a plastic and therefore nonmagnetic material is chemically plated in a preferred form with a copper-nickle-chrome composition, there is thus established by this staking operation a current flow path between the housing 30 and the lid 14. It should be noted also that by the use of the limited area projections 52 the bonding of the radial flanges 50 for plug 48 to the upper end of the housing 30 will not disturb the conductive coating path between the projection 52 even though the plug 48 is sealing the bore 32. Therefore, there will be an electrical current path from the spring lead 36 via the electroconductive coating on the housing 30 to the lid 14. The coating composition for the housing 30 is to be chosen from nonmagnetic type compositions having a high electrical conductance.

Next a float is assembled from annular and hollow plastic sections 62 and 64 after an annular magnet 66 is fixed within the section 64 by spin welding or ultrasonically bonding these float sections together. The magnet 66 is fixed within the section 64 at the lower extremity of same and is chosen to be of a predetermined weight in order to blast the assembled float to provide a normal fluid line 68 therefor above the area of the magnet 66 and to permit the float to operate freely of the housing 30 when the switch assembly is immersed in the fluid of the reservoir 12. The float traps an annular volume of fluid between it and the housing to act as a damper thereon.

The switch assembly is then completed by bonding a cap 70 to the lowermost end of the housing 30 by ultrasonic or spin welding the cap to a limited area of projections 72 on this end of the housing 30 (see FIG. 4). Again in this assembly the use of the limited area projection 72 provides an uninterrupted path of coating between the inside and outside walls of the housing about this end, as exists about the other or upper end of the housing 30 previously described.

As will be familiar to those skilled in the art, the lid 14 is then provided with a sealing diaphragm 74 prior to its assembly to the reservoir 12 of the master cylinder 10, which sealing diaphragm 74 will remain with the lid. In reference now to FIG. 1 a preferred method of assembling the lid 14 to the reservoir 12 is by means of a spring bail 76 that is pivotally associated with the master cylinder 10 to provide a compression on the sealing diaphragm 74 with respect to the walls of the reservoir 12.

OPERATION

In operation, and assuming a normal or slightly below normal fluid level such as level 68 shown with respect to the float of FIG. 2, the magnetic elements within the reed switch capsule 34 will be maintained in the open position and light 24 will not be activated by the voltage source shown as the vehicle's battery 28.

In the event, however, that the fluid level 68 drops to a predetermined low condition, the float will drop accordingly; and, when the magnet 66 overlies the area of the spaced ends of the magnetic contacts within the reed capsule 34, the flux field will close these contacts to complete the circuitry for the voltage source to the bulb 24 and a light, preferably red, will glow on the dash to warn the operator of a low fluid level requiring attention.

Thereafter the operator should request servicing of the master cylinder whereby bail 76, after the disconnecting of lead 22 with the male terminal 44 in the recess 46 of the plug 48, will be pivoted to one side and the lid 14 may be removed and the reservoir 12 replenished by the service station operator or mechanic according to where the operator has deposited his vehicle.

It will be immediately realized that upon the replenishing of the reservoir 12 the float will again remove itself from the area where the magnet 66 provides the flux field closing contacts within the reed switch 34, so that the bulb 24 will be extinguished to indicate to the operator that all is normal again with respect to this master cylinder fluid level.

If desired, the electrical circuitry from the voltage source to the bulb can be provided with a connection to the starter switch of the vehicle so that the bulb will be momentarily illuminated whenever the vehicle is started to thereby indicate to the vehicle operator that it is in good order for warning him of a low fluid level, when such arises.

Having fully described an operative construction for my invention, it is now desired to set forth the intended protection sought by these Letters Patent as follows:

1. In a master cylinder:
a wall defining a reservoir therewithin;
a cover member for closing said reservoir;
an annular housing defining a bore therewithin extending from said cover member into said reservoir;
an electrically conductive coating on the inner and outer circumferential surfaces of said housing and extending across at least one end of the latter to provide an electrically conductive path between said inner and outer surfaces;
magnetically operated switch means having a pair of contacts mounted in said bore;
a terminal carried by said housing electrically insulated from said inner and outer surfaces;
one of said contacts being connected to said terminal;
the other contact engaging said inner surface whereby the other contact is electrically connected to said wall through said coating and said cover member;
a float operatively connected to said housing for vertical movement in response to variations in the liquid level within said housing;
a magnet mounted in said float for actuating said switch when the liquid level falls to a point disposing the magnet in a position wherein the magnetic field of the latter envelopes said means; and
a closure member for one end of said housing;
said one end being provided with a plurality of spaced serrations;
said closure member being secured to said housing by deforming said serrations;
said coating extending through the recesses defined between said serrations.

2. In a master cylinder:
a wall defining a reservoir therewithin;
a cover member for closing said reservoir;
an annular housing defining a bore therewithin extending from said cover member into said reservoir;
an electrically conductive coating on the inner and outer circumferential surfaces of said housing and extending across at least one end of the latter to provide an electrically conductive path between said inner and outer surfaces;
magnetically operated switch means having a pair of contacts mounted in said bore;
a terminal carried by said housing electrically insulated from said inner and outer surfaces;
one of said contacts being connected to said terminal;
the other contact engaging said inner surface whereby the other contact is electrically connected to said wall through said coating and said cover member;
a float operatively connected to said housing for vertical movement in response to variations in the liquid level within said housing;
a magnet mounted in said float for actuating said switch when the liquid level falls to a point disposing the magnet in a position wherein the magnetic field of the latter envelops said switch means; and
said housing being stepped to defined larger and smaller diameter portions with a shoulder therebetween;
said shoulder being formed with spaced serrations extending therearound, said housing being mounted on said cover member by deforming said serrations.